(12) United States Patent
Kiyozaki

(10) Patent No.: US 7,664,973 B2
(45) Date of Patent: Feb. 16, 2010

(54) INTEGRATED CIRCUIT AND SIGNAL PROCESSING APPARATUS USING THE SAME

(75) Inventor: Kenichi Kiyozaki, Mizuho (JP)

(73) Assignee: Sanyo Electric Co., Ltd., Osaka (JP)

( * ) Notice: Subject to any disclaimer, the term of this patent is extended or adjusted under 35 U.S.C. 154(b) by 538 days.

(21) Appl. No.: 11/688,599

(22) Filed: Mar. 20, 2007

(65) Prior Publication Data
US 2007/0229122 A1   Oct. 4, 2007

(30) Foreign Application Priority Data
Mar. 23, 2006 (JP) .............................. 2006-080796

(51) Int. Cl.
- G06F 1/04 (2006.01)
- G06F 1/06 (2006.01)
- G06F 1/30 (2006.01)

(52) U.S. Cl. .............. 713/300; 713/310; 713/320; 713/330; 713/340; 700/297

(58) Field of Classification Search .......... 713/300, 713/310, 320, 330, 340
See application file for complete search history.

(56) References Cited

U.S. PATENT DOCUMENTS

| | | | | |
|---|---|---|---|---|
| 5,619,707 | A * | 4/1997 | Suboh | 713/322 |
| 5,991,883 | A * | 11/1999 | Atkinson | 713/300 |
| 6,178,514 | B1 * | 1/2001 | Wood | 713/300 |
| 6,338,143 | B1 * | 1/2002 | Shimazaki | 713/340 |
| 6,631,474 | B1 * | 10/2003 | Cai et al. | 713/300 |
| 6,735,105 | B2 * | 5/2004 | Nakano | 365/52 |
| 6,904,532 | B2 * | 6/2005 | Matsumoto | 713/320 |
| 7,076,674 | B2 * | 7/2006 | Cervantes | 713/310 |
| 7,441,132 | B2 * | 10/2008 | Haider | 713/300 |
| 2003/0115494 | A1 | 6/2003 | Cervantes | |

FOREIGN PATENT DOCUMENTS

JP   2001-184146   7/2001

OTHER PUBLICATIONS

Chinese International Patent Office, First Notification of Examination Remarks for Application No. 2007100857448, mail date May 16, 2008.

* cited by examiner

Primary Examiner—Thomas Lee
Assistant Examiner—Zahid Choudhury
(74) Attorney, Agent, or Firm—SoCal IP Law Group LLP; Steven C. Sereboff; John E. Gunther

(57) ABSTRACT

An integrated circuit that operates with application of an external power source supplying a first source voltage, the circuit comprising: a source voltage monitoring unit that monitors the level of the first source voltage supplied from the external power source, and that determines whether the first source voltage is supplied from the external power source; a clock selecting unit that is supplied with a first clock of a first frequency and a second clock of a second frequency lower than the first frequency, and that selects and outputs the first clock when it is determined by the source voltage monitoring unit that the first source voltage is supplied and the second clock when it is determined by the source voltage monitoring unit that the first source voltage is not supplied; and a processor that operates with supply of either one of the first clock and the second clock output by the clock selecting unit and controls the operation of the integrated circuit.

7 Claims, 4 Drawing Sheets

INTEGRATED CIRCUIT AND SIGNAL PROCESSING APPARATUS USING THE SAME

CROSS-REFERENCE TO RELATED APPLICATION

This application claims the benefit of priority to Japanese Patent Application No. 2006-80796, filed Mar. 23, 2006, of which full contents are incorporated herein by reference.

BACKGROUND OF THE INVENTION

1. Field of the Invention

The present invention relates to an integrated circuit and a signal processing apparatus by use thereof.

2. Description of the Related Art

In accordance with a recent progress of electronic technology, there has been a remarkable spread of signal processing apparatuses that have a selling point of portability for handiness of carrying and execute signal processing for desired applications such as portable audio players, cellular phones, portable game machines, and PDAs (Personal Digital Assistants). Such signal processing apparatuses achieve the portability by mounting an internal power source composed of a secondary battery (nickel hydrogen rechargeable battery, lithium ion rechargeable battery, etc.) and a primary battery (alkaline battery, manganese battery, etc.) (see, e.g., Japanese Patent Application Laid-Open Publication No. 2001-184146).

In this connection, long-time execution of the desired application only with a source voltage of the internal power source will necessarily result in an increased power consumption of the internal power source. Accordingly, in consideration of the fact that a large variety of applications are executed for a long time, measures to further reduce the power consumption is essential for the signal processing apparatus and existing measures are insufficient.

SUMMARY OF THE INVENTION

In order to solve the above problem, according to a major aspect of the present invention there is provided an integrated circuit that operates with application of an external power source supplying a first source voltage, the circuit comprising: a source voltage monitoring unit that monitors the level of the first source voltage supplied from the external power source, and that determines whether the first source voltage is supplied from the external power source; a clock selecting unit that is supplied with a first clock of a first frequency and a second clock of a second frequency lower than the first frequency, and that selects and outputs the first clock when it is determined by the source voltage monitoring unit that the first source voltage is supplied and the second clock when it is determined by the source voltage monitoring unit that the first source voltage is not supplied; and a processor that operates with supply of either one of the first clock and the second clock output by the clock selecting unit and controls the operation of the integrated circuit.

The present invention enables reduced power consumption by the integrated circuit by appropriately controlling the source voltage supplied depending on the state of supply of external power source.

BRIEF DESCRIPTION OF THE DRAWINGS

For more thorough understanding of the present invention and advantages thereof, reference should be made to the following description together with accompanying drawings.

DETAILED DESCRIPTION OF THE INVENTION

At least the following matters will become apparent from this specification and accompanying drawings.

<External Connection of Signal Processing Apparatus>

Figure 1:
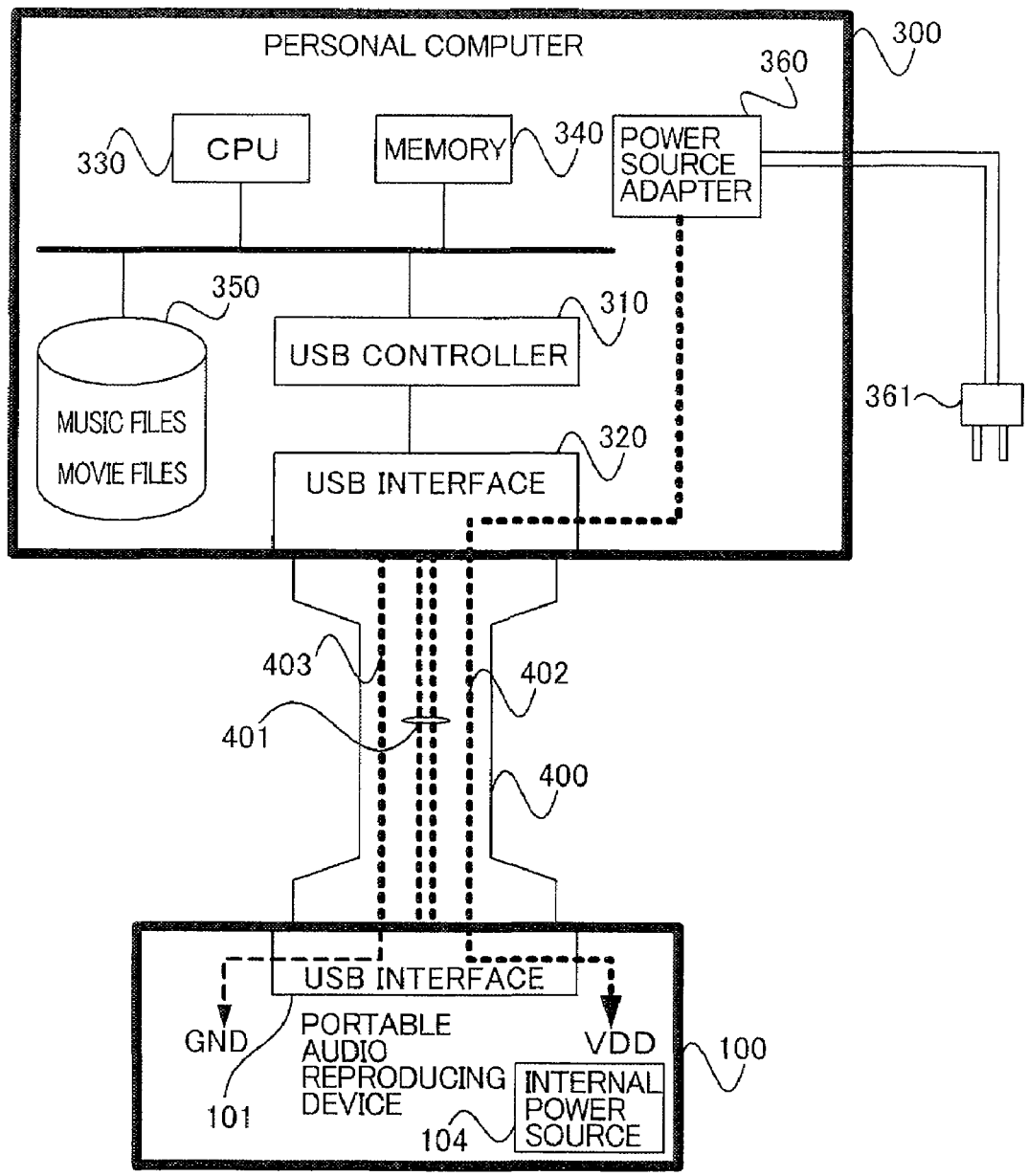
FIG. 1 is an explanatory diagram of external connection of a signal processing apparatus according to the present invention.

FIG. 1 is an explanatory diagram of external connection of a signal processing apparatus according to the present invention. In the following, description will be made of a portable audio reproducing device 100 having a USB (Universal Serial Bus) interface 101 that performs digital reproduction of compressed audio data transferred from a personal computer 300 by way of a data line 401 of a USB cable 400 as an example of the signal processing apparatus according to the present invention. The signal processing apparatus according to the present invention may be, for example, a cellular phone, a portable game machine, a PDA, etc.

The USB is a serial interface standard that enables a variety of signal processing apparatuses with common USB interface to be connected to a USB host device. The latest version of the USB is "USB2.0" that has three transfer modes of LS (Low Speed), FS (Full Speed), and HS (High Speed), with the three modes being selectable depending on applications. The USB permits a maximum number of 127 USB devices to be connected to a host in a tree structure by use of hubs and accommodates a hot plug that permits a new USB device to be connected to the USB host device while the host is powered on.

Firstly it is assumed that the personal computer 300 is equipped with a USB controller 310 and a USB interface 320. In this case, by connecting the USB interface 320 in the personal computer 300 and a USB interface 101 in the portable audio reproducing device 100 using the USB cable 400, the personal computer 300 and the portable audio reproducing device 100 are connected. The USB cable 400 comprises a two data lines 401, a power line 402, and a GND line 403, and each of the USB interfaces 320 and 101 is equipped with a pair of data terminals D+ and D−, a power source terminal VBUS, and a GND terminal.

The personal computer 300 has a power source adapter 360 that converts an AC source voltage supplied by way of a power plug 361 to a DC source voltage, and has a CPU 330 in charge of overall control, a memory 340 such as a ROM for storing various programs, and a hard disk 350 for storing music files, movie files, etc., all interconnected for mutual communication. The music files stored in the hard disk 350 are compressed audio data, for example, of MPEG-1 Audio Layer 3 (MP3) format, etc., and the movie files stored in the hard disk 350 are compressed movie data, for example, of MPEG-2 format, MPEG-4 format, etc.

Description will then be made of an outline of the data transfer of a music file from the personal computer 300 to the portable audio reproducing device 100. Firstly, the personal computer 300 runs the program stored in the memory 340 and, by polling request, etc., recognizes the portable audio reproducing device 100 as a USB device connected to itself. Next, the personal computer 300 reads out an arbitrary music file from the hard disk 350 and transfers the data to the USB controller 310. The USB controller 310 converts the music file read out from the hard disk 350 to the packet format and performs communication protocol processing conforming to the USB standard for differential half duplex transmission to the portable audio reproducing device 100 by way of the USB interface 320 and the USB cable 400. As a result, the portable audio reproducing device 100 can take in the music file from the personal computer 300.

When the data transfer of the music file from the personal computer 300 is completed, the portable audio reproducing device 100 executes reproducing processing of the music file, generally with the USB cable 400 disconnected from the USB interface 101. However, in the case of completion of the data transfer of the music file, even if the USB cable 400 remains connected to the USB interface 101, the portable audio reproducing device 100 can execute reproducing processing of the music file.

The personal computer 300 can supply the DC source voltage generated at the power source adapter 360 (hereinafter, source voltage VBUS) to the portable audio reproducing device 100 by use of the power line 402 provided in the USB cable 400. In other words, the portable audio reproducing device 100 can receive the supply of the source voltage VBUS together with the transfer of the music file from the personal computer 300.

Therefore, the portable audio reproducing device 100 can perform the communication protocol processing conforming to the USB standard with the personal computer 300 and the reproducing processing of the music file, using the source voltage VBUS supplied by the personal computer 300 as an operating voltage, to restrain the power consumption of the internal power source 104.

<Portable Audio Reproducing Device>

Figure 2:
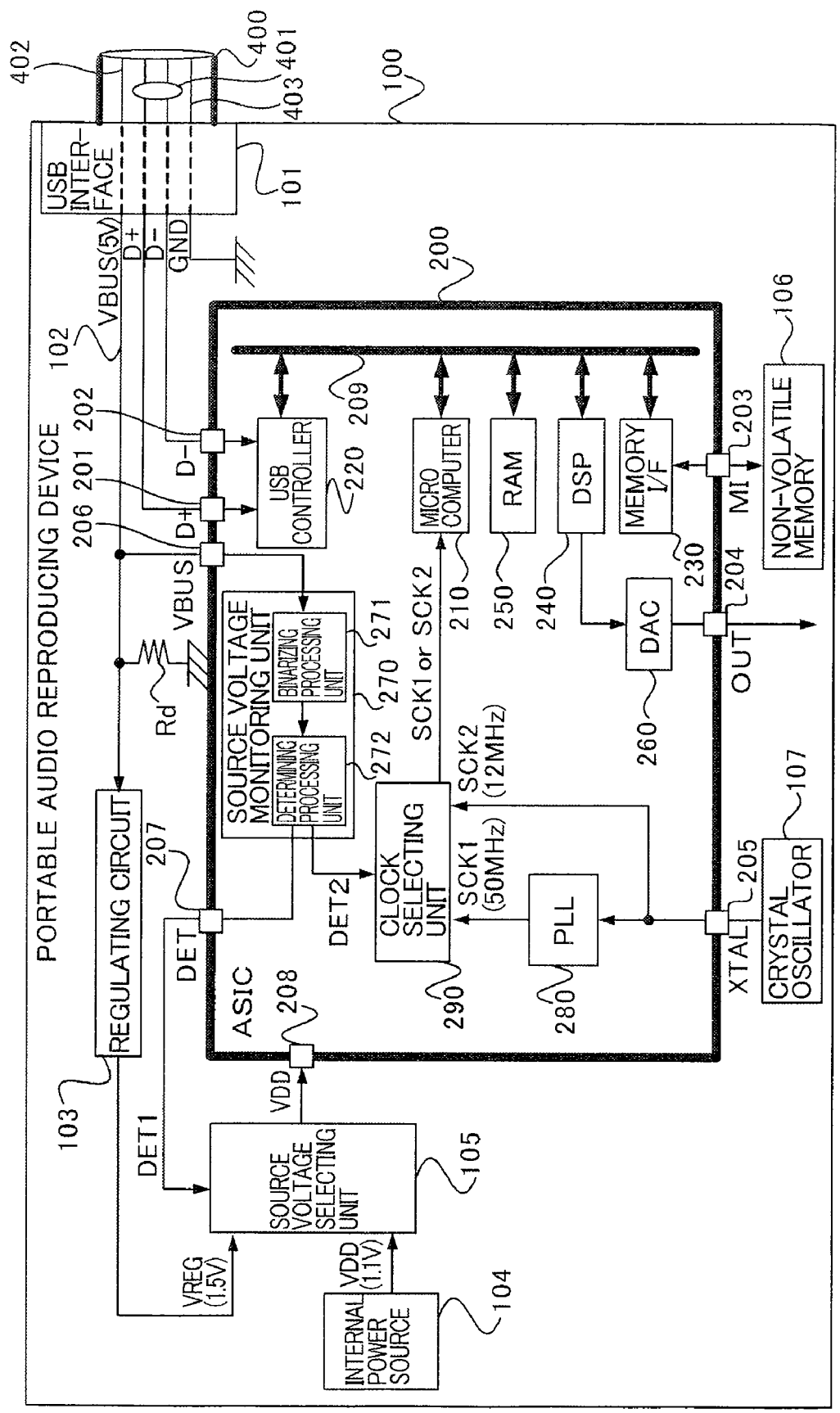
FIG. 2 is a configuration diagram of the signal processing apparatus according to the present invention.

FIG. 2 is a diagram of a configuration of the portable audio reproducing device 100. As shown in FIG. 2, the portable audio reproducing device 100 comprises an ASIC (Application Specific Integrated Circuit) 200 as an embodiment of "integrated circuit" according to the present invention and its peripheral circuits. The "integrated circuit" is realized by the ASIC 200 in this embodiment, but may also be realized by an FPGA (Field Programmable Gate Array) or a PLD (Programmable Logic Device).

In the following, description will be made of the configuration of the portable audio reproducing device 100, divided into two separate parts, the configuration of the peripheral circuits of the ASIC 200 and the configuration of the ASIC 200.

===Configuration of ASIC Peripheral Circuits===

The USB interface 101 is an interface for enabling the connection for communication with the personal computer 300 by way of the USB cable 400 containing the power line 402. As described above, the USB cable 400 comprises a two data lines 401, a power line 402, and a GND line 403, and the USB interface 101 is provided with a pair of data terminals D+ and D−, a power source terminal VBUS, and a GND terminal.

A regulating circuit 103 generates a regulated source voltage VREG ("first source voltage" according to the present invention) by regulating the level of the source voltage VBUS of a power line 102 wired from the USB interface 101 to the level of voltage (3.3 V, 1.5 V, etc.) necessary for execution by ASIC 200 of the communication protocol processing for which a high speed is required (HS mode, FS mode, etc.).

The source voltage that is supplied from the personal computer 300 as USB bus power is specified to be within the range of "+4.75 V to +5.25 V" and, in this embodiment, the level of the source voltage VBUS is determined as "5 V". The level of regulated source voltage VREG is determined as "1.5 V".

The internal power source 104 is a power source comprising one or more secondary batteries (such as the nickel hydrogen rechargeable battery (nominal voltage of 1.2 V) and the lithium ion rechargeable battery (nominal voltage of 3.6 V to 3.7 V)) or one or more primary batteries (such as the alkaline battery (nominal voltage of 1.5 V) and the manganese battery (nominal voltage of 1.5 V)) and generates a source voltage VDD ("second source voltage" according to the present invention) of a level lower than that of the regulated source voltage VREG.

In this embodiment, the internal power source 104 is assumed to be composed of the nickel hydrogen rechargeable battery (nominal voltage of 1.2 V) that is rechargeable and is the secondary battery of the lowest nominal voltage. The source voltage VDD should preferably be at the level as low as possible for the lower power consumption of the ASIC 200, but taking into account the normally operable range of the ASIC 200 and a semiconductor process of the ASIC 200, the source voltage VDD is assumed to be "1.1 V", the order of 90% of the nominal voltage (1.2 V).

When a source voltage selecting unit 105 determines, based on a selecting signal DET1 supplied from a source voltage monitoring unit 270 to be described later by way of a DET terminal 207, that the source voltage VBUS is being supplied from the personal computer 300 to the portable audio reproducing device 100, the source voltage selecting unit 105 selects the regulated source voltage VREG. On the other hand, when the source voltage selecting unit 105 determines, based on the selecting signal DET1, that the source voltage VBUS is not being supplied from the personal computer 300 to the portable audio reproducing device 100, the source voltage selecting unit 105 selects the source voltage VDD.

A non-volatile memory 106 is an external memory for storing the music files transferred from the personal computer 300 by way of the USB cable 400. The non-volatile memory 106 may be, for example, a flash memory. Other than this embodiment, when a larger volume of data is stored, a hard disk (not shown) may be employed in place of the non-volatile memory 106.

A crystal oscillator 107 is an external oscillating device for generating by oscillation a base clock SCK2 that serves as a reference in a PLL circuit 280. Other than this embodiment, it may be so arranged that a self-oscillated clock is supplied from outside of the portable audio reproducing device 100.

===Configuration of ASIC===

The ASIC 200 comprises terminals of a D+ terminal 201, a D− terminal 202, an MI terminal 203, an OUT terminal 204, a XTAL terminal 205, a VBUS terminal 206, a DET terminal 207, and a VDD terminal 208.

The D+ terminal 201 and the D− terminal 202 are an input/output terminals for connection to the data terminals D+ and D−, respectively, of the USB interface 101. The MI terminal 203 is an input/output terminal for connection to the non-volatile memory 106. The OUT terminal 204 is an output terminal for outputting results of reproduction of the music files. The XTAL terminal 205 is a terminal for connection to the crystal oscillator 107.

The VBUS terminal 206 is an input terminal for connection to the power line 102 wired from the power source terminal of the USB interface 101. The DET terminal 207 is an output terminal for outputting the selecting signal DET1 as the result of determination by the source voltage monitoring unit 270. The VDD terminal 208 is an input terminal to which either one of the regulated source voltage VREG and the source voltage VDD as selected by the source voltage selecting unit 105 is applied.

The ASIC 200 comprises a microcomputer 210, a USB controller 220, a memory interface circuit 230, a DSP (Digital Signal Processor) 240, a RAM 250, and a D/A converter 260, all connected with one another for mutual communication by way of an internal bus 209, and further comprises the source voltage monitoring unit 270, the PLL circuit 280, and a clock selecting unit 290.

The microcomputer 210 is a processor in control of the ASIC 200 as a whole. The microcomputer 210 supervises and controls the communication protocol processing at the USB controller 220, the processing of reproducing the music files at the DSP 240, etc. The microcomputer 210 operates at a multiplied clock SCK1 or a base clock SCK2 supplied by a clock selecting unit 290 to be described later.

The USB controller 220 performs the processing of the communication protocol on the part of the portable audio reproduction device 100 and comprises a USB transceiver that relays to the internal bus 209 of the ASIC 200 the data differentially input to the D+ terminal 201 and the D− terminal 202 from the USB interface 101, a decoder that decodes packets, a FIFO used as a data buffer, etc. For example, the USB controller 220, upon command from the microcomputer 210, transfers the music file transferred from the personal computer 300 to the memory interface circuit 230 by way of the internal bus 209.

The memory interface circuit 230 is a circuit for controlling the reading or writing of the data between the ASIC 200 and the non-volatile memory 106 connected to the MI terminal 203. For example, the memory interface circuit 230 performs the processing of writing the music file transferred from the USB controller 220 to the non-volatile memory 106.

The DSP 240 is a circuit for performing the digital signal processing associated with the reproduction of the music file. For example, at the time of reproducing the music file, upon command from the microcomputer 210, the music file written to the non-volatile memory 106 is read out by the memory interface circuit 230 and is stored in the RAM 250 as a working memory. The DSP 240 reads out the music file stored in the RAM 250 and performs decoding processing in conformity to the data format thereof (e.g., the MP3 decoding, etc.). Then, thus decoded digital signal is converted to an analog signal by the D/A converter 260 and thereafter, is output to the outside by way of the OUT terminal 204.

The source voltage monitoring unit 270 determines whether the source voltage VBUS is being supplied from the personal computer 300, by monitoring the level of the source voltage VBUS that can be supplied from the personal computer 300 by way of the power line 402 when the USB cable 400 is connected to the USB interface 101.

To be more specific, a pull-down resistor Rd is provided in advance on the power line 102 electrically connected to the power line 402 by way of the USB interface 101. Then, when the USB cable 400 is connected to the USB interface 101 and the source voltage VBUS is supplied from the personal computer 300, the level of the voltage applied to the VBUS terminal 206 becomes "5 V". On the other hand, when the USB cable 400 is disconnected from the USB interface 101, the source voltage VBUS is not supplied from the personal computer 300, and therefore, the level of the voltage applied to the VBUS terminal 206 becomes "0 V", due to the pull-down resistor Rd.

The source voltage monitoring unit 270 comprises a binarizing processing unit 271 and a determining processing unit 272. The binarizing processing unit 271, by comparing the level of the voltage applied to the VBUS terminal 206 with a predetermined reference level Vth (e.g., 2.5 V), outputs either a High level or a Low level.

The determining processing unit 272, by measuring a period of time of the High level or the Low level output from the binarizing processing unit 271, determines that the source voltage VBUS is being supplied from the personal computer 300 when the High level has continued for a certain period of time Th and that the source voltage VBUS is not being supplied from the personal computer 300 when the Low level has continued for a certain period of time Th. In this manner, by not making determination until after the High level or the Low level output by the binarizing processing unit 271 has continued for a certain period of time Th, an erroneous result of determination can be prevented from occurring, for example, due to a power source noise of a spike form.

The result of determination by the determining processing unit 272 is used as a selecting signal DET1 for the selection by the source voltage selecting unit 105 of either the regulated source voltage VREG or the source voltage VDD and as a selecting signal DET2 for the selection by the clock selecting unit 290 of either the multiplied clock SCK1 or the base clock SCK2. Since the source voltage selecting unit 105 is a peripheral circuit of the ASIC 200, the selecting signal DET1 is output to the source voltage selecting unit 105 by way of the DET terminal 207.

The PLL circuit 280 is a circuit for generating the multiplied clock SCK1 ("first clock" according to the present invention) in synchronization with the base clock SCK2 ("second clock" according to the present invention) supplied from the crystal oscillator 107 by way of the XTAL terminal 205. A frequency f1 ("first frequency" according to the present invention) of the multiplied clock SCK1 is a frequency obtained by multiplying a frequency f2 ("second frequency" according to the present invention) of the base clock SCK2 by a reciprocal of a number for dividing frequency of a frequency divider circuit (not shown) in the PLL circuit 280. In this embodiment, the frequency f1 of the multiplied clock SCK1 is assumed to be "50 MHz" and the frequency f2 of the base clock SCK2 is assumed to be "12 MHz".

The clock selecting unit 290 is supplied with the multiplied clock SCK1 output from the PLL circuit 280 and the base clock SCK2 before input to the PLL circuit 280. When the source voltage VBUS is being supplied from the personal computer 300, the clock selecting unit 290 selects the multiplied clock SCK1 and supplies it to the microcomputer 210. On the other hand, when the source voltage VBUS is not being supplied from the personal computer 300, the clock selecting unit 290 selects the base clock SCK2 and supplies it to the microcomputer 210.

When the source voltage VBUS is supplied from the personal computer 300 to the portable audio reproducing device 100, the regulated source voltage VREG of a level higher than that of the source voltage VDD is selected so that the power of the internal power source 104 will not be consumed and at the same time, on the premise that the regulated source voltage VREG is selected, the multiplied clock SCK1 of a frequency higher than that of the base clock SCK2 is selected so that the microcomputer 210 will not stop its operation and hang up.

Since the power consumption of the ASIC 200 is proportional to the operating clock frequency, the selection of the multiplied clock SCK1 of a higher frequency results in an increase in the power consumption of the ASIC 200 as compared with the case of selecting the base clock SCK2. In this case, however, since the regulated source voltage VREG in accordance with the source voltage VBUS supplied from the personal computer 300 is used as the operating voltage, the portable audio reproducing device 100 does not need to worry about the power consumption of the internal power source 104. In this manner, without worrying above the power consumption of the internal power source 104, the portable audio reproducing device 100 can use, for example, the multiplied clock SCK1 of a high frequency and consequently, can perform high-speed processing of data transfer of the music file from the personal computer 300 by way of the USB cable 400.

Even after completion of the data transfer of the music file from the personal computer 300, when the USB cable 400 remains connected to the USB interface 101, the source voltage VBUS continues to be supplied from the personal computer 300 and therefore, the portable audio reproducing device 100 can continue to perform the reproducing processing of the music file, using the regulated source voltage VREG and the multiplied clock SCK1, while restraining the power consumption of the internal power source 104.

On the other hand, when the USB cable 400 is not connected to the USB interface 101 and the source voltage VBUS is not supplied from the personal computer 300 to the portable audio reproducing device 100, the base clock SCK2 of a frequency lower than that of the multiplied cock SCK1 is selected and therefore, the power consumption of the ASIC 200 is reduced as compared with the case of selecting the multiplied clock SCK1. Furthermore, in this case, since the source voltage VDD is selected that is of the level lower than that of the regulated source voltage VREG and of the level minimally required for causing the ASIC 200 to operate, the power consumption of the ASIC 200 can be further reduced. As a result of reduced power consumption of the ASIC 200, a reproducing time of the music file can be extended.

<Operation of ASIC>

===Operation in Case of Disconnecting USB Cable===

Figure 3:
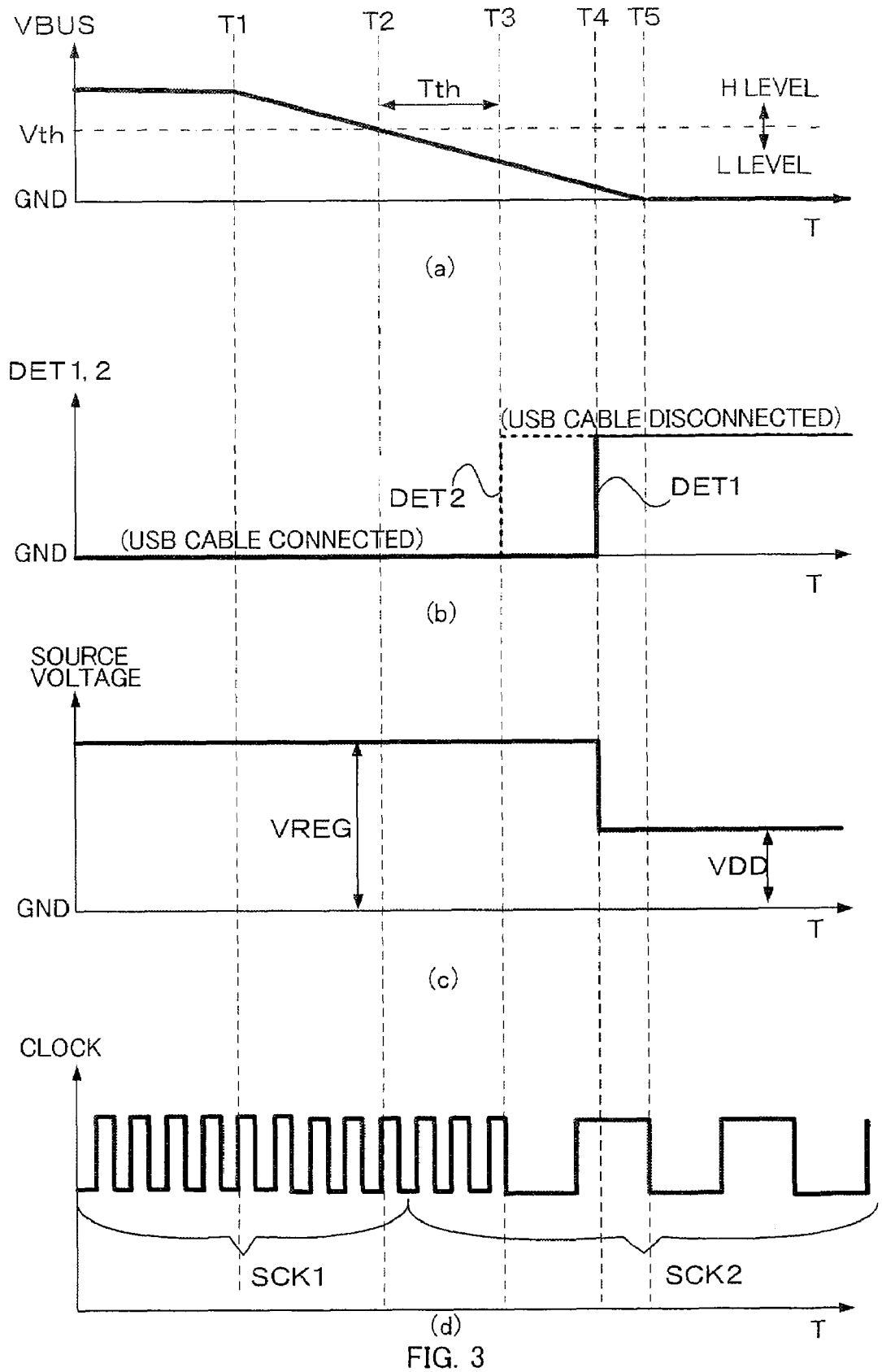
FIG. 3 is waveform diagrams of primary signals for description of operation of an integrated circuit according to the present invention.

Description will be made of the operation of the ASIC 200 when, following the completion of the data transfer of the music file, an unexpected accident, etc., the situation where the USB cable 400 is connected to the USB interface 101 is switched to the situation where the USB cable 400 is disconnected, with reference to FIG. 3. FIG. 3(a) depicts a waveform of the level of the voltage applied to the VBUS terminal 206, FIG. 3(b) depicts waveforms of the selecting signals DET1 and DET2 output from the source voltage monitoring unit 270, FIG. 3(c) depicts a waveform of the source voltage applied to the VDD terminal 208, and FIG. 3(d) depicts a waveform of the clock supplied from the clock selecting unit 290 to the microcomputer 210.

Firstly, the case is assumed to be that the USB cable 400 is connected to the USB interface 101 and the music file is data-transferred, and the source voltage VBUS is supplied, from the personal computer 300 to the portable audio reproducing device 100.

Consequently, the level of the voltage applied to the VBUS terminal 206 is "5 V" (see FIG. 3(a)) and the source voltage monitoring unit 270 determines that the source voltage VBUS is being supplied from the personal computer 300 (both of DET1 and DET2 at Low level) (see FIG. 3(b)). As a result, the source voltage selecting unit 105 selects the regulated source voltage VREG, based on the Low level of the selecting signal DET1 (see FIG. 3(c)). The clock selecting unit 290 selects the multiplied clock SCK1, based on the Low level of the selecting signal DET2.

At time T1, the USB cable 400 is disconnected from the USB interface 101. In this case, from time T1 toward time T5, the level of the voltage applied to the VBUS terminal 206 is attenuated to "0 V", due to the pull-down resistor Rd connected to the power line 102 (see FIG. 3(a)).

Next, at time T2, the level of the voltage applied to the VBUS terminal 206 is below the reference level Vth (see FIG. 3(a)) and the output of the binarizing processing unit 271 is at Low level. However, to prevent the erroneous determination due to the power source noise of the spike form, the selecting signals DET1 and DET2 output from the determining processing unit 272 remain at Low level (see FIG. 3(b)).

Then, at time T3, after an elapse of a certain time Tth after time T2, the determining processing unit 272 switches the selecting signal DET2, earlier than the selecting signal DET1, from the Low level to the High level (see FIG. 3(b)). The reason is that, since the output of the binarizing processing unit 271 is still at Low level, the determining processing unit 272 does not consider it to be a level change attributable to the power source noise. As a result, the clock selecting unit 290 selects the base clock SCK2, based on the High level of the selecting signal DET2 (see FIG. 3(d)).

Then, at time T4, before the level of the voltage at the VBUS terminal 206 is completely attenuated to "0 V" at time T5, the determining processing unit 272 switches the selecting signal DET1 from the Low level to the High level. As a result, the source voltage selecting unit 105 selects the source voltage VDD based on the High level of the selecting signal DET1 (see FIG. 3(c)).

As seen above, when the source voltage monitoring unit 270 switches from the determination that the source voltage VBUS is being supplied from the personal computer 300 to the determination that the source voltage VBUS is not being supplied from the personal computer 300, the clock selecting unit 290 switches from the selection of the multiplied clock SCK1 to the selection of the base clock SCK2 earlier than the selection of the regulated source voltage VREG is switched to the selection of source voltage VDD at the source voltage selecting unit 105.

The use of the multiplied clock SCK1 is absolutely premised on the supply of the regulated source voltage VREG. For this reason, following the disconnection of the USB cable 400, the regulated source voltage VREG of a higher level is switched to the source voltage VDD of a lower level only after the multiplied clock SCK1 of a high frequency is switched to the base clock SCK2 of a low frequency.

===Operation in Case of Connecting USB Cable===

Figure 4:
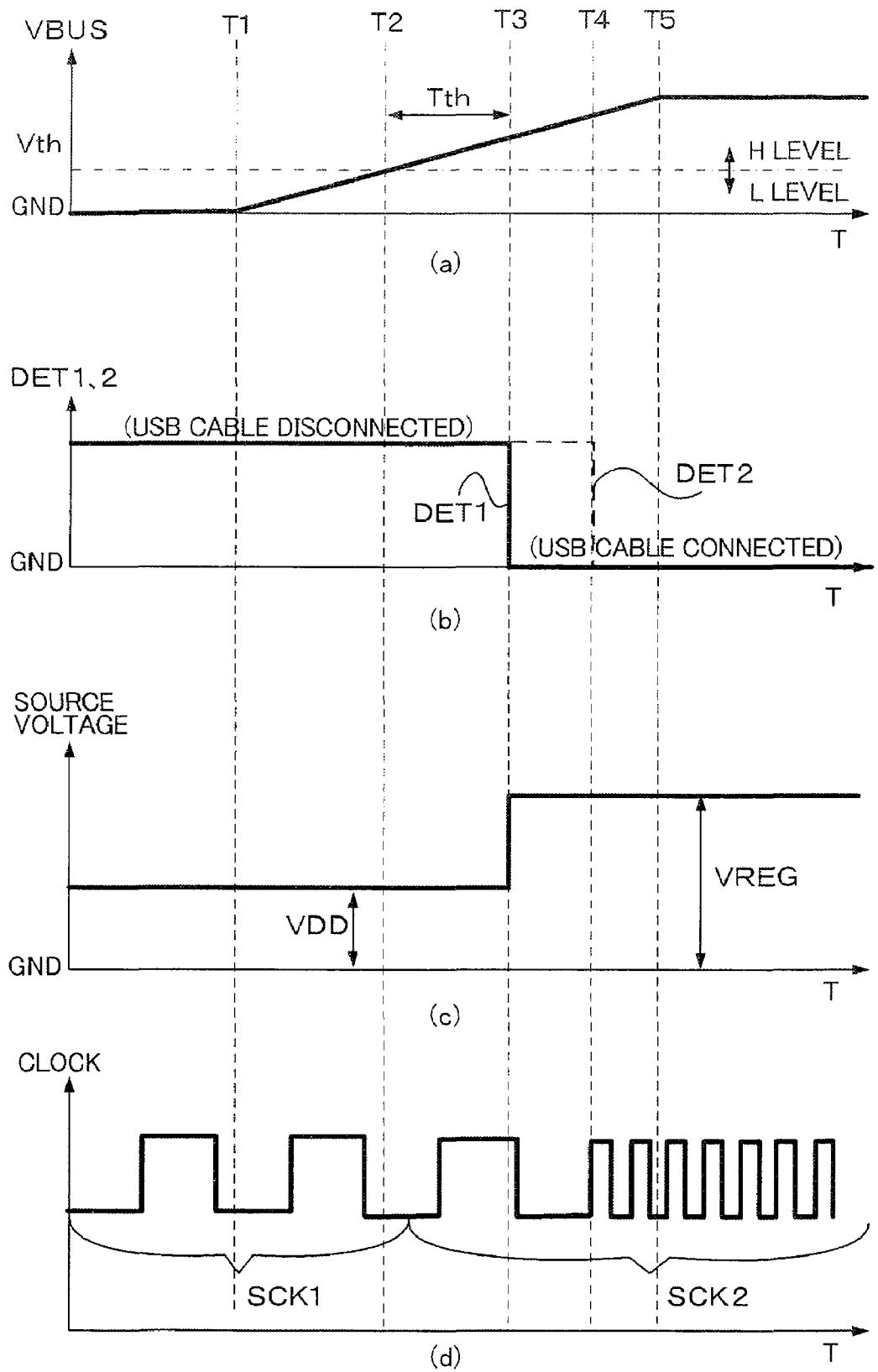
FIG. 4 is waveform diagrams of primary signals for description of operation of the integrated circuit according to the present invention.

Description will be made of the operation of the ASIC 200 when, to execute the data transfer of the music file, the situation where the USB cable 400 is disconnected from the USB interface 101 is switched to the situation where the USB cable 400 is connected to the USB interface 101, with reference to FIG. 4. FIGS. 4(a), 4(b), 4(c), and 4(d) depict same kinds of waveforms as shown in FIGS. 3(a), 3(b), 3(c), and 3(d), respectively.

Firstly, the case is assumed to be that the USB cable 400 is disconnected from the USB interface 101 and the portable audio reproducing device 100 is not supplied with the source voltage VBUS from the personal computer 300.

Consequently, the level of the voltage applied to the VBUS terminal 206 is "0 V" (see FIG. 4(a)) and the source voltage monitoring unit 270 determines that the source voltage VBUS is not being supplied from the personal computer 300 (both of DET1 and DET2 at High level) (see FIG. 4(b)). As a result, the source voltage selecting unit 105 selects the source voltage VDD, based on the High level of the selecting signal DET1

(see FIG. 4(c)) and the clock selecting unit 290 selects the base clock SCK2, based on the High level of the selecting signal DET2.

At time T1, the USB cable 400 is connected to the USB interface 101. In this case, from time T1 toward time T5, the level of the voltage applied to the VBUS terminal 206 increases from "0 V" to "5 V" (see FIG. 4(a)).

Next, at time T2, the level of the voltage applied to the VBUS terminal 206 is above the reference level Vth (see FIG. 4(a)) and the output of the binarizing processing unit 271 is at High level. However, to prevent the erroneous determination due to the power source noise of the spike form, the selecting signals DET1 and DET2 output from the determining processing unit 272 remain at High level (see FIG. 4(b)).

Then, at time T3, after an elapse of a certain time Tth after time T2, the determining processing unit 272 switches the selecting signal DET1, earlier than the selecting signal DET2, from High level to Low level (see FIG. 4(b)). The reason is that, since the output of the binarizing processing unit 271 is still at High level, the determining processing unit 272 does not consider it to be a level change attributable to the power source noise. Incidentally, during the period from time T1 to time T3, the regulated source voltage VREG is generated by the regulating circuit 103. As a result, the source voltage selecting unit 105 selects the regulated source voltage VREG, based on the Low level of the selecting signal DET1 (see FIG. 4(c)).

Then, at time T4, before the level of the voltage at the VBUS terminal 206 completely increases to "5 V" at time T5, the determining processing unit 272 switches the selecting signal DET2 from the High level to the Low level. As a result, the clock selecting unit 290 selects the multiplied clock SCK1, based on the Low level of the selecting signal DET2 (see FIG. 4(d)).

As seen above, when the source voltage monitoring unit 270 switches from the determination that the source voltage VBUS is not being supplied from the personal computer 300 to the determination that the source voltage VBUS is being supplied from the personal computer 300, the clock selecting unit 290 switches from the selection of the base clock SCK2 to the selection of the multiplied clock SCK1 later than the selection of the source voltage VDD is switched to the selection of the regulated source voltage VREG at the source voltage selecting unit 105.

The use of the multiplied clock SCK1 is absolutely premised on the supply of the regulated source voltage VREG. For this reason, following the connection of the USB cable 400, the base clock SCK2 of a low frequency is switched to the multiplied clock SCK1 of a high frequency only after the source voltage VDD of a lower level is switched to the regulated source voltage VREG of a higher level.

While description has been made of the embodiment of the present invention, the above embodiment is intended for easy understanding of the present invention and is not to be interpreted to limit the present invention. Changes and improvements can be made to the present invention without departing from the intent thereof and the present invention includes equivalents thereof.

It is claimed:

1. An integrated circuit that operates with application of an external power source supplying a first source voltage, the circuit comprising:
    a source voltage monitoring unit that monitors the level of the first source voltage supplied from the external power source, and that determines whether the first source voltage is supplied from the external power source;
    a clock selecting unit that is supplied with a first clock of a first frequency and a second clock of a second frequency lower than the first frequency, and that selects and outputs the first clock when it is determined by the source voltage monitoring unit that the first source voltage is supplied and the second clock when it is determined by the source voltage monitoring unit that the first source voltage is not supplied;
    a processor that operates with supply of either one of the first clock and the second clock output by the clock selecting unit and controls the operation of the integrated circuit
    wherein the integrated circuit operates with application of either one of the external power source and an internal power source supplying a second source voltage, whose level is lower than that of the first source voltage, and wherein the source voltage monitoring unit controls so as to apply the first source voltage when determining that the first source voltage is supplied, and so as to apply the second source voltage when determining that the first source voltage is not supplied.

2. The integrated circuit of claim 1, wherein the first source voltage is supplied from an interface that performs data communication and that is capable of supplying the first source voltage.

3. The integrated circuit of claim 1, further comprising a PLL circuit that generates the first clock based on the second clock.

4. The integrated circuit of claim 1, wherein the source voltage monitoring unit switches the selection at the clock selecting unit after the change of the source voltage at the start of supply of the first source voltage, and switches the selection at the clock selecting unit prior to the change of the source voltage at the termination of supply of the first source voltage.

5. The integrated circuit of claim 1, further comprising a digital signal processing circuit that performs processing of decoding digital data, wherein the digital signal processing circuit operates in accordance with either one of the first source voltage and the second source voltage the selection of which is controlled by the source voltage monitoring unit.

6. A signal processing apparatus comprising the integrated circuit of claim 5, wherein the signal processing apparatus further comprises a source voltage selecting unit that outputs either one of the first source voltage and the second source voltage in accordance with a result of determination by the source voltage monitoring unit, the source voltage selecting unit being connected to the external power source and the internal power source, and wherein the integrated circuit operates in accordance with either one of the first source voltage and the second source voltage as output by the source voltage selecting unit.

7. The signal processing apparatus of claim 6, further comprising a non-volatile memory for storing the digital data, wherein the digital signal processing circuit reads out the digital data stored in the non-volatile memory and performs decoding processing.

* * * * *